United States Patent
Vo et al.

(10) Patent No.: US 10,461,942 B1
(45) Date of Patent: Oct. 29, 2019

(54) MULTI-FACTOR AUTHENTICATION WITH CODE ROTATION

(71) Applicant: United Services Automobile Association (USAA), San Antonio, TX (US)

(72) Inventors: Hoang Trung Vo, San Antontio, TX (US); Sudarshan Rangarajan, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 144 days.

(21) Appl. No.: 15/652,810

(22) Filed: Jul. 18, 2017

Related U.S. Application Data

(60) Provisional application No. 62/364,625, filed on Jul. 20, 2016.

(51) Int. Cl.
  *H04L 9/32* (2006.01)
  *H04L 9/08* (2006.01)
  *H04L 9/16* (2006.01)
  *H04L 29/06* (2006.01)

(52) U.S. Cl.
  CPC ............ *H04L 9/3263* (2013.01); *H04L 9/085* (2013.01); *H04L 9/0869* (2013.01); *H04L 9/16* (2013.01); *H04L 9/3231* (2013.01); *H04L 63/083* (2013.01); *H04L 2463/082* (2013.01)

(58) Field of Classification Search
  CPC ..... H04L 9/3263; H04L 9/085; H04L 9/0869; H04L 9/16; H04L 9/3231; H04L 63/083; H04L 2463/082
  See application file for complete search history.

(56) References Cited

U.S. PATENT DOCUMENTS

| | | | | |
|---|---|---|---|---|
| 8,908,868 | B1 * | 12/2014 | Baer | G06F 21/6209 380/277 |
| 2003/0069848 | A1 * | 4/2003 | Larson | H04L 41/22 705/50 |
| 2004/0059924 | A1 * | 3/2004 | Soto | G06F 21/32 713/186 |

(Continued)

OTHER PUBLICATIONS

Zhang et al., A Coalition Key-Evolving Signature Scheme towards Intrusion Resilient Mobile Networks for Industrial Applications, Nov. 2003, 29th Annual Conference of the IEEE Industrial Electronics Society, vol. 2, pp. 1447-1452 (Year: 2003).*

*Primary Examiner* — Kenneth W Chang
(74) *Attorney, Agent, or Firm* — Fish & Richardson P.C.

(57) ABSTRACT

Techniques are described for multi-factor authentication and device verification based at least partly on a periodically changing (e.g., rotating) security code. A rotating security code may be generated on a user device and used to sign a certificate. The certificate may be encrypted, using a private key stored on the user device, and communicated to a backend service for verifying that the user device is authorized to access secure information. The backend service may decrypt the certificate (e.g., using a public key associated with the private key), extract the security code from the decrypted certificate, and compare the extracted security code to a security code associated with the user device. If the codes correspond to one another, the user device may be verified and provided with access to secure information such as secure data, a secure portion of an application, and so forth.

20 Claims, 5 Drawing Sheets

(56) References Cited

U.S. PATENT DOCUMENTS

| | | | |
|---|---|---|---|
| 2006/0280309 A1* | 12/2006 | Krishnaswamy | H04L 63/0428 380/285 |
| 2007/0067618 A1* | 3/2007 | Sandhu | H04L 9/302 713/155 |
| 2011/0035596 A1* | 2/2011 | Attia | H04L 9/321 713/175 |
| 2011/0289378 A1* | 11/2011 | Grube | G06F 11/2094 714/760 |
| 2012/0159591 A1* | 6/2012 | Payne | G06F 21/35 726/7 |
| 2014/0189840 A1* | 7/2014 | Metke | G06F 21/41 726/9 |
| 2016/0099935 A1* | 4/2016 | Luskin | H04L 63/0435 713/175 |
| 2017/0005810 A1* | 1/2017 | Pedersen | H04L 9/3268 |

* cited by examiner

US 10,461,942 B1

MULTI-FACTOR AUTHENTICATION WITH CODE ROTATION

CROSS-REFERENCE TO RELATED APPLICATION

The present disclosure is related to, and claims priority to, U.S. Provisional Patent Application Ser. No. 62/364,625, titled "Multi-Factor Authentication with Code Rotation," which was filed on Jul. 20, 2016, the entirety of which is incorporated by reference into the present disclosure.

BACKGROUND

Organizations and individuals that operate and/or manage computing systems may implement various security measures to prevent unauthorized individuals, devices, and processes from accessing secured data stored on the systems, gaining control of processes executing on the systems, introducing new (e.g., malicious) processes to the systems, and/or gaining access for other purposes. Traditionally, a user may provide one or more credentials to gain access to a system. Such credentials may include a username, password, and/or personal identification number (PIN). By comparing the supplied credentials with previously established credentials for the user, a determination may be made whether to permit or deny the requested access. In some instances, tokens such as cryptographic keys may be employed to authenticate an individual and/or verify that an individual or process is authorized to access a system. Cryptographic keys may also be employed to secure communications over a network.

SUMMARY

Implementations of the present disclosure are generally directed to user authentication and/or device verification. More specifically, implementations are directed to using a rotating security code to sign a certificate which is provided for device verification to determine access to secure information.

In general, innovative aspects of the subject matter described in this specification can be embodied in methods that include actions of: retrieving a first cryptographic key from data storage on a user device; generating an instance of a rotating security code, wherein the rotating security code changes with a periodicity; signing a certificate using the instance of the rotating security code, wherein the certificate is an assertion that the user device is authorized to access secure information; encrypting the certificate using the first cryptographic key; and communicating the encrypted certificate to a service that verifies, based on the certificate, that the user device is authorized to access secure information.

Implementations can optionally include one or more of the following features: the first cryptographic key is retrieved from the data storage in response to a successful authentication of a user of the user device based on authentication data associated with the user; the authentication data includes one or more of biometric data and a personal identification number (PIN); the instance of the rotating security code is generated based on a shared secret that is stored in the data storage on the user device; a copy of the shared secret is accessible by the service for use in verifying that the user device is authorized to access the secure information; the instance of the rotating security code is generated using an algorithm for random or pseudo-random number generation; the instance of the rotating security code is communicated to the service for use in verifying that the user device is authorized to access the secure information; the actions further include retrieving a device identifier (ID) from the data storage, the device ID uniquely identifying the user device among a plurality of user devices; the actions further include communicating the device ID with the certificate to the service for use in verifying that the user device is authorized to access the secure information; the device ID is a token that complies with a version of an OAuth standard; and/or verifying that the user device is authorized to access the secure information includes decrypting the certificate to recover the instance of the security code from the certificate, the decrypting using a second cryptographic key that is associated with the first cryptographic key, comparing the instance of the security code with an expected instance of the security code, and based on a correspondence between the instance of the security code and an expected instance of the security code, allowing the user device to access the secure information.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. In traditional systems that rely solely on user credentials such as PIN, username, and/or password to control access to secure information, such security may be readily breached if an unauthorized user or process gains access to the credential(s). Moreover, such credentials may be cumbersome for an authorized user to remember, particularly in situations where the user holds many different credentials for accessing various systems. Implementations may avoid such disadvantages and provide stronger security than traditional systems by performing an initial authentication based on biometric data (e.g., fingerprint) followed by device verification based on a dynamically rotating security code. Moreover, by providing authentication and device verification that are stronger and more reliable than traditional systems, implementations reduce or eliminate the consumption of processing capacity, storage capacity, memory, networking resources, and/or other computing resources that would be consumed by a traditional system to recover from errors in authentication or device verification, or to perform repeated attempts to authenticate a user and/or verify a device for secure access.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
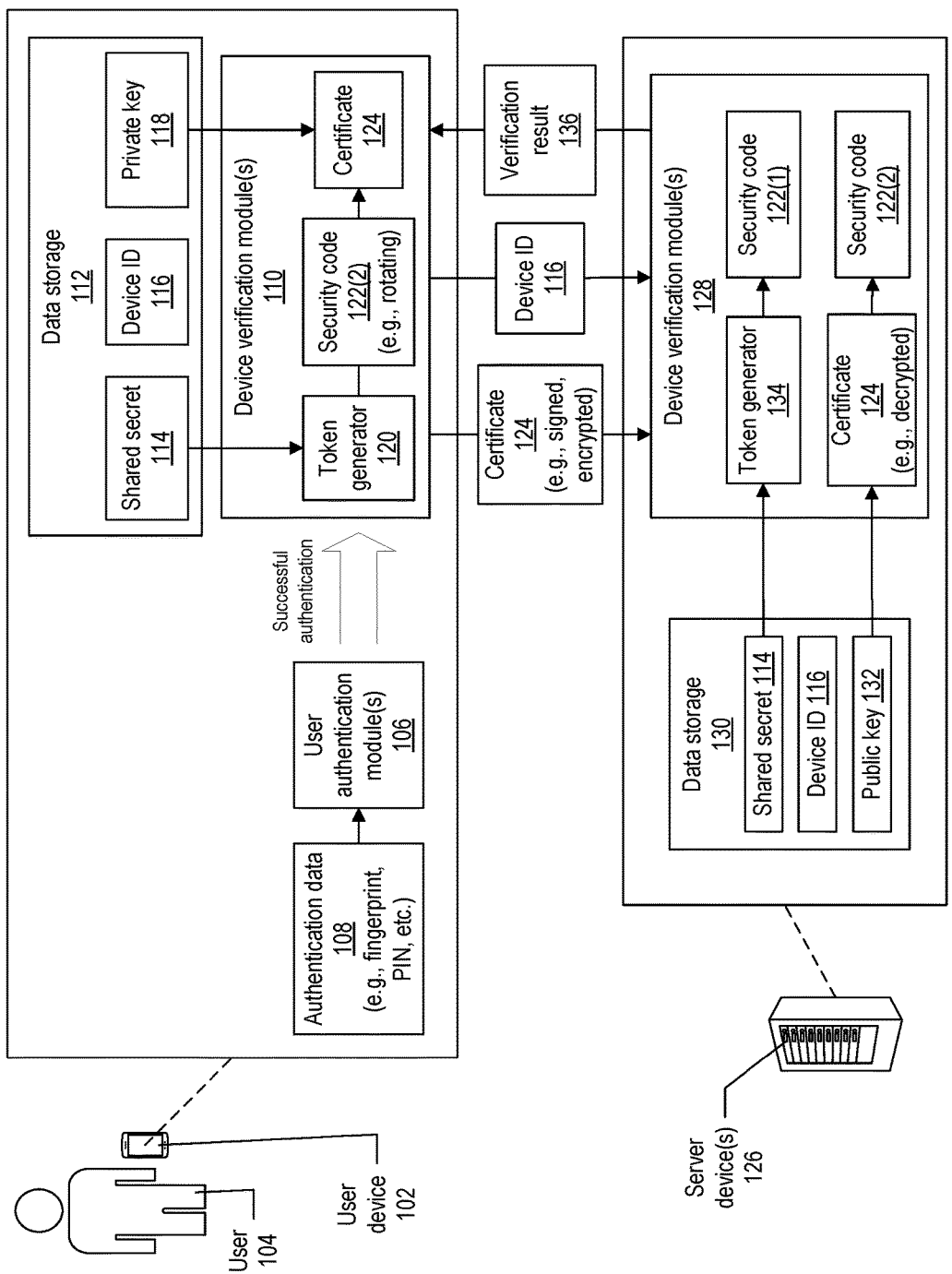
FIG. 1 depicts an example system for multi-factor authentication and device verification, according to implementations of the present disclosure.

Implementations of the present disclosure are directed to systems, devices, methods, and computer-readable media for multi-factor authentication and device verification based at least partly on a periodically changing (e.g., rotating) security code. A rotating security code may be generated on a user device and used to sign a certificate. The certificate may be encrypted, using a private key stored on the user device, and communicated to a backend service for verifying that the user device is authorized to access secure information. The backend service may decrypt the certificate (e.g., using a public key associated with the private key), extract the security code from the decrypted certificate, and compare the extracted security code to a security code associated with the user device. If the codes correspond to one another, the user device may be verified and provided with access to secure information such as secure data, a secure portion of an application, and so forth.

In some implementations, the security code is a rotating security code that is generated based on a cryptographic secret shared between the user device and the service. In such instances, the security code may be rotating (e.g., changing), such that the algorithm that generates the security code may generate a different instance of the security code every N seconds, where N is any suitable number (e.g., 30 seconds). The backend service may generate its own version of the security code using the algorithm, and a correspondence between the codes may indicate that the user device is verified. In some implementations, the security code is randomly, or pseudo-randomly, generated on the user device and communicated to the backend service with the encrypted certificate. In such instances, a correspondence between the communicated security code and the code retrieved from the certificate may indicate that the certificate has not been tampered with and that the user device is verified for secure access.

In some implementations, additional factors may be used to ensure that the user device and/or user of the user device is authorized to access the secure information. For example, an initial authentication of the user may be performed based on authentication data such as biometric data (e.g., the user's swiped fingerprint), a personal identification number (PIN) of the user, and/or other authentication data provided by the user. If the user is successful authenticated based on the authentication data, device verification may proceed based on the certificate signed by the security code. In some implementations, an additional device identifier (ID) may also be used to verify the user device.

Native authentication methods, such as fingerprint verification, PIN-based authentication, and so forth, are typically controlled by the client-side processes executing on a native mobile device. This may create a problem in that a server-side application may not be able to determine if the client device is trusted, and thus may not be able to determine if a user is authenticated in a secure fashion when coming in from the mobile channel. For example, if an individual is able to compromise and/or root a client device, and is able to bypass or crack the fingerprint authentication on the compromised and/or rooted device, the individual may be able to access an application that relies on the client-side authentication method and the individual may be able to perform fraudulent, unauthorized actions through the application.

Some implementations may employ a client-side (e.g., biometric) authentication method, with server-side validation based on a rotating security code, to ensure that a user is authenticated successfully using client-side authentication and to further ensure that the user device being employed is a trusted device. In some implementations, an assertion of a dynamic message may be used such as an assertion based on public key infrastructure (PKI). Implementations may combine a PKI assertion of a dynamic message with a digital soft token to ensure that a successful client-side authentication is coming from a trusted device and an authorized user. This allows for a server-side authentication framework to use the same PKI mechanism to assert the incoming client-side authentication request initiated through entry of a PIN, scanning a fingerprint, or other authentication techniques.

In traditional systems that rely solely on user credentials such as PIN, username, and/or password to control access to secure information, such security may be readily breached if an unauthorized user or process gains access to the credential(s). Moreover, such credentials may be cumbersome for an authorized user to remember, particularly in situations where the user holds many different credentials for accessing various systems. Implementations may avoid such disadvantages and provide stronger security than traditional systems by performing an initial authentication based on biometric data (e.g., fingerprint) followed by device verification based on a dynamically rotating security code.

FIG. 1 depicts an example system for multi-factor authentication and device verification, according to implementations of the present disclosure. As shown in the example of FIG. 1, a user device 102 may be operated by a user 104. The user device 102 may be any suitable type of computing device. In some instances, the user device 102 is a portable (e.g., mobile) computing device such as a smartphone, tablet, wearable computer, and so forth. The user device 102 may also be a less portable computing device such as a desktop computer, laptop computer, and so forth. The system may also include one or more server devices 126 that communicate with the user device 102 over one or more networks. The server device(s) 126 may include any suitable number and type of computing devices.

The user device 102 may execute user authentication module(s) 106 that authenticate the user 104 as a valid user of the user device 102 based on collected authentication data 108. In some implementations, the user authentication module(s) 106 may authenticate the user 104 based on authentication data 108 that includes biometric data. For example, the user device 102 may include a component to scan and/or collect an image of the user's fingerprint, and the fingerprint data may be employed to authenticate the user 104. Implementations also support other forms of biometric authentication, including but not limited to one or more of the following:

Facial recognition, including capturing one or more images of the user's face using a camera of the user device 102 and comparing the image(s) to previously captured and stored image data associated with the user 104;

Heartbeat detection through analysis of recorded video of the user 104, to detect whether the user 104 is currently exhibiting a heartbeat at the time of attempted authentication (e.g., to prevent unauthorized access using a still image of the user to fool facial recognition);

Voice recognition, including prompting the user 104 to repeat (e.g., one or more times) a word or multi-word phrase presented on a user device 104, receiving and recording audio data of the user's speech through a microphone of the user device 102, and comparing the recorded audio data to a previously stored voice print associated with the user 104;

Authentication based on comparing a detected eye color of the user 104 to previously stored information describing the user's eye color;

Pulse pattern recognition, in which a collected heartbeat and/or pulse waveform of the user 104 is compared to a previously stored waveform associated with the user 104; and/or Neural activity pattern recognition, in which collected neural activity data (e.g., brain wave data) of the user 104 is compared to a previously stored neural activity waveform associated with the user 104.

Galvanic skin response information for the user 104, electrical impedance measurements of portion(s) of the user's body (e.g., skin), and/or other measured electrical and/or magnetic properties of the user 104.

The user authentication module(s) 106 may also employ other modes for authenticating the user 104, including but not limited to one or more of the following:

Authentication based on a PIN, including receiving a user-entered PIN and comparing the PIN to a previously stored PIN associated with the user 104;

Knowledge-based authentication (KBA) of the user 104 based on previously set up questions, e.g., "what is your mother's maiden name?", "what is the name of your favorite pet?", and so forth;

Device recognition, including verifying that the device type, operating system, or identifier (e.g., MAC address, manufacturer serial number, etc.) of the user device 102 corresponds to that of a device previously associated with the user 104; and/or Single sign-on authentication, in which the user device 102 and/or user 104 is provided sent a one-time code or password to use to gain access.

The user authentication module(s) 106 may employ any suitable number of authentication techniques, in any combination, to authenticate the user 104 based on the authentication data 108. In some instances, the user authentication module(s) 106 may receive the authentication data 108 and make one or more calls out to an external service (e.g., executing on the server device(s) 126) to request authentication of the user 104 based on previously collected and stored authentication data for the user 104. For example, authentication data 108 such as a received PIN and/or fingerprint scan may be sent to the external service(s). The external service(s) may compare the fingerprint data and/or PIN to a fingerprint or PIN that is known to be that of the user 104. If there is a correspondence between the sets of data, the user 104 may be authenticated. In some implementations, the user authentication mode(s) employed by the user authentication module(s) 106 may comply, at least in part, with a version of the Fast Identity Online (FIDO) specification for authentication technologies.

Based on a successful authentication of the user 104, one or more device verification modules 110 may execute on the user device 102 to perform various device verification operations. In some implementations, the device verification module(s) 110 may access data storage 112 on the user device 102. The data storage 112 may be particularly configured to securely store cryptographic information on the user device 102. For example, the data storage 112 may be a version of the KeyChain cryptographic data management system provided by iOS™. The data storage 112 may store a private key 118 to be used in PKI cryptographic schemes. The data storage 112 may also store a device ID 116. The device ID 116 may be uniquely associated with the user device 102 among a population of user devices. The device ID 116 may have been previously issued to and stored on the user device 102 during a registration process through which the user device 102 is registered with a backend service (e.g., provided by the server device(s) 126). In some implementations, the device ID 116 may have been issued by an external security service such as that provided by Verisign, Inc.™. In some implementations, the device ID 116 may be a token that complies with a version of the Open Authentication (OAuth) standard, and such a token may have been issued by an OAuth compliant token-issuing authority.

In the example of FIG. 1, the data storage 112 stores a shared secret 114, which is also stored in data storage 130 on the server device(s) 126. In some implementations, the shared secret 114 may be provided to the user device 102 as part of an initial registration of the user device 102 with a backend service. The device verification module(s) 110 may include a token generation 120 that employs the shared secret to generate a security code 122 on the user device 102. In some implementations, the security code 122 may be a rotating (e.g., dynamically changing) security code 122, such that the particular value of the security code 122 differs from instance to instance. In some implementations, the security code 122 may be generated with a different value after a predetermined period of time. For example, during a time period from T to T+P, the security code 122 may be generated with a first value, and during a time period from T+P to T+2P, the security code 122 may be generated with a second value, and so forth. Implementations support the use of any appropriate value for the periodicity P. For example, the periodicity P may be 30 seconds.

As described above, the device verification module(s) 110 may generate a certificate 124 that is signed with the security code 122. The signed certificate 124 may be encrypted using the private key 118. The signed, encrypted certificate 124 may be communicated to one or more device verification modules 128 executing on the server device(s) 126. The communicated certificate 124 may be described as a security challenge in which the user device 102 asserts its authorization to access secure information. In some implementations, the device ID 116 may also be communicated to the device verification module(s) 128 in a same or separate communication as the certificate 124.

The device verification module(s) 128 executing on the server device(s) 126 may access data storage 130. The data storage 130 may store one or more of the shared secret 114, the device ID 116, and/or the public key 132 each associated with the user device 102. The public key 132 may be associated with the private key 116 on the user device 102 as a PKI public/private key pair. The device verification module(s) 128 may decrypt the received certificate 124 using the public key 132, and retrieve the security code 122(2) from the decrypted certificate 124 (e.g., the security code 122(2) that was used to sign the certificate 124 on the user device 102). In some implementations, device verification module(s) 128 may include a token generator 134 that generates a security code 122(1). The token generator 134 may employ the same, or a similar, algorithm as the token generator 120 to generate the security code 122(1) based on the shared secret 114 retrieved from data storage 130.

The device verification module(s) 128 may compare the generated security code 122(1) to the security code 122(2) retrieved from the decrypted certificate 124, and determine a verification result 136 based on the result of the comparison. If the security codes 122(1) and 122(2) match, and/or correspond to one another, the verification result 136 may be a positive result indicating that the user device 102 is verified to access secure information. If the security codes 122(1) and 122(2) do not match or otherwise do not correspond to one another, the verification result 136 may be a negative result indicating that the user device 102 is not verified to access secure information. The verification result 136 may be communicated back to the user device 102, and the user device 102 may be permitted or denied access to secure information accordingly.

In some implementations, the determination of the verification result 136 may be further based on the device ID 116. The data storage 130 may store a copy of the device ID 116 that was provided to the user device 102 during a registration of the user device 102. The device verification module(s) 128 may compare the device ID 116 retrieved from data storage 130 to the device ID 116 communicated from the user device 102 with the certificate 124. If the communicated device ID 116 matches and/or corresponds to the device ID 116 from the data storage 130, and the security codes 122(1) and 122(2) match and/or correspond to one another, the user device 102 may be verified and permitted access to the secure information.

In some implementations, access to the user device 102, and/or secure information stored on the user device 102 or elsewhere, may be disabled by preventing access to the private key 118 stored in the data storage 112, thus preventing the use of the private key 118 to sign the certificate 124. For example, based on an indication that the user device 102 has been stolen or otherwise compromised, the server device(s) 126 may send a signal to the user device 102 that causes the user device 102 to prevent access to the secure data storage 112 on the user device 102 that stores the private key 118, thus barring the process that uses the private key 118 to sign the certificate 124 and assert authorization to access secure information.

Figure 2:
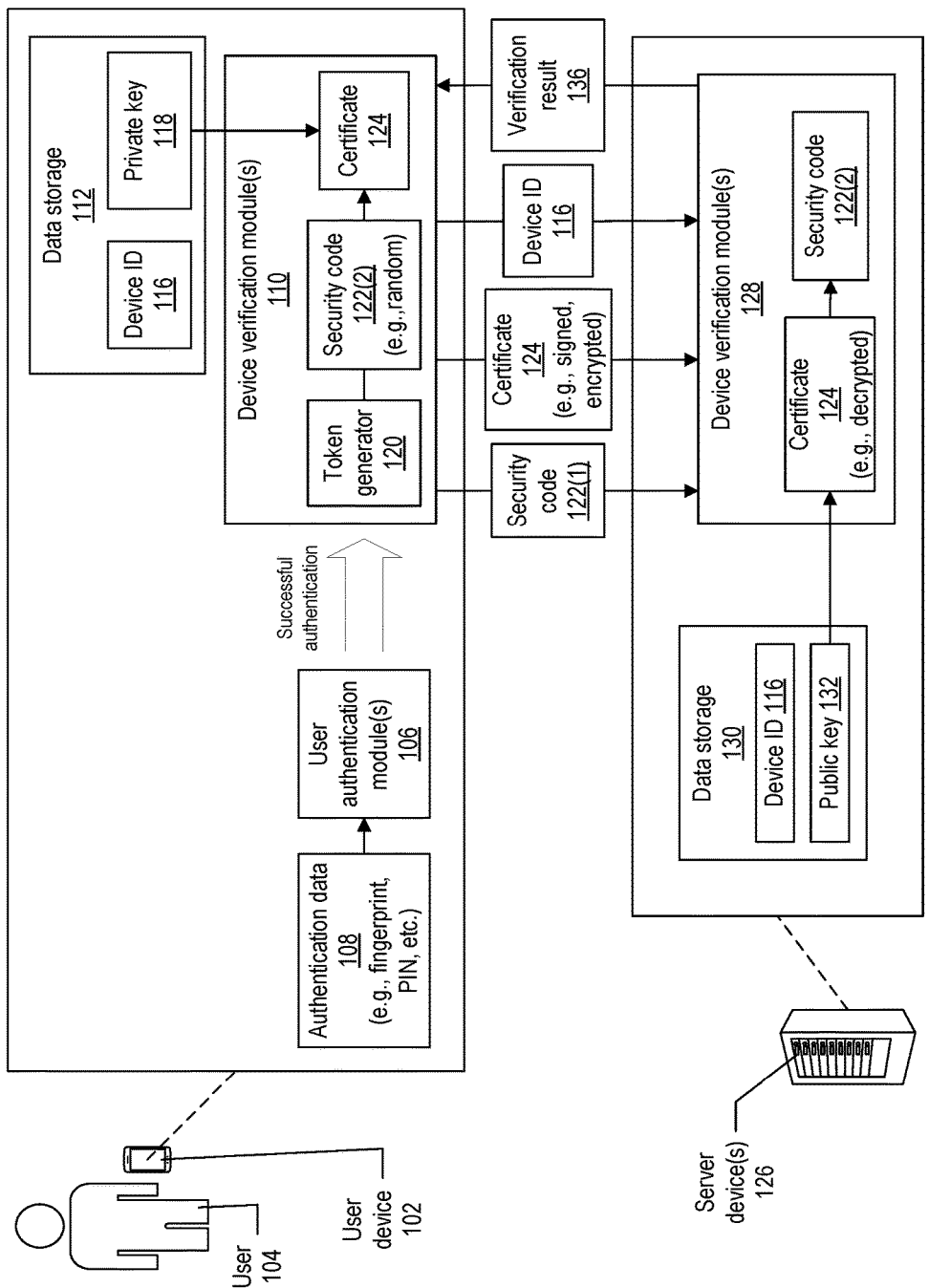
FIG. 2 depicts an example system for multi-factor authentication and device verification, according to implementations of the present disclosure.

FIG. 2 depicts an example system for multi-factor authentication and device verification, according to implementations of the present disclosure. The elements depicted in FIG. 2 may be configured similarly to like-numbered elements in FIG. 1, and/or perform operations that are similar to those performed by like-numbered elements in FIG. 1.

In some implementations, as shown in the example of FIG. 2, the security code may not be independently generated on the server device(s) 126 as described above. Instead, the security code 122 that is generated on the user device 102 may be communicated from the user device 102 to the device verification module(s) 128 with the signed, encrypted certificate 124 and/or device ID 116. The device verification module(s) 128 may then compare the communicated security code 122(1) to the security code 122(2) that is retrieved from the decrypted certificate 124. The verification result 136 may be determined based on the comparison. In some implementations, the security code 122 may be generated by the token generator 120 on the user device 102 based on the shared secret 114 as described above. In some implementations, the token generator 120 may employ a random (or pseudo-random) number generation algorithm to generate the security code 122 as a random (or pseudo-random) number that rotates (e.g., changes) with a predetermined periodicity.

Implementations support the use of any suitable data format and/or size for the security code 122 that is generated and/or communicated per the examples of FIGS. 1 and 2. For example, the security code 122 may be a six-digit numeral. In some implementations, the shared secret 114 may be a semantic token.

Although FIGS. 1 and 2 depict the data storage 112 and the data storage 130 as local storage on the user device 102 and server device(s) 126 respectively, implementations are not so limited. In some implementations, the data storage 112 may be external to the user device 102 and accessible to the device verification module(s) 110 over one or more networks. In some implementations, the data storage 130 may be external to the server device(s) 126 and accessible to the device verification module(s) 128 over one or more networks. The data storage 112 and/or data storage 130 may be secured (e.g., hardened) against unauthorized access, to ensure that the cryptographic information stored therein is not accessible by unauthorized devices, processes, and/or individuals.

Figure 3:
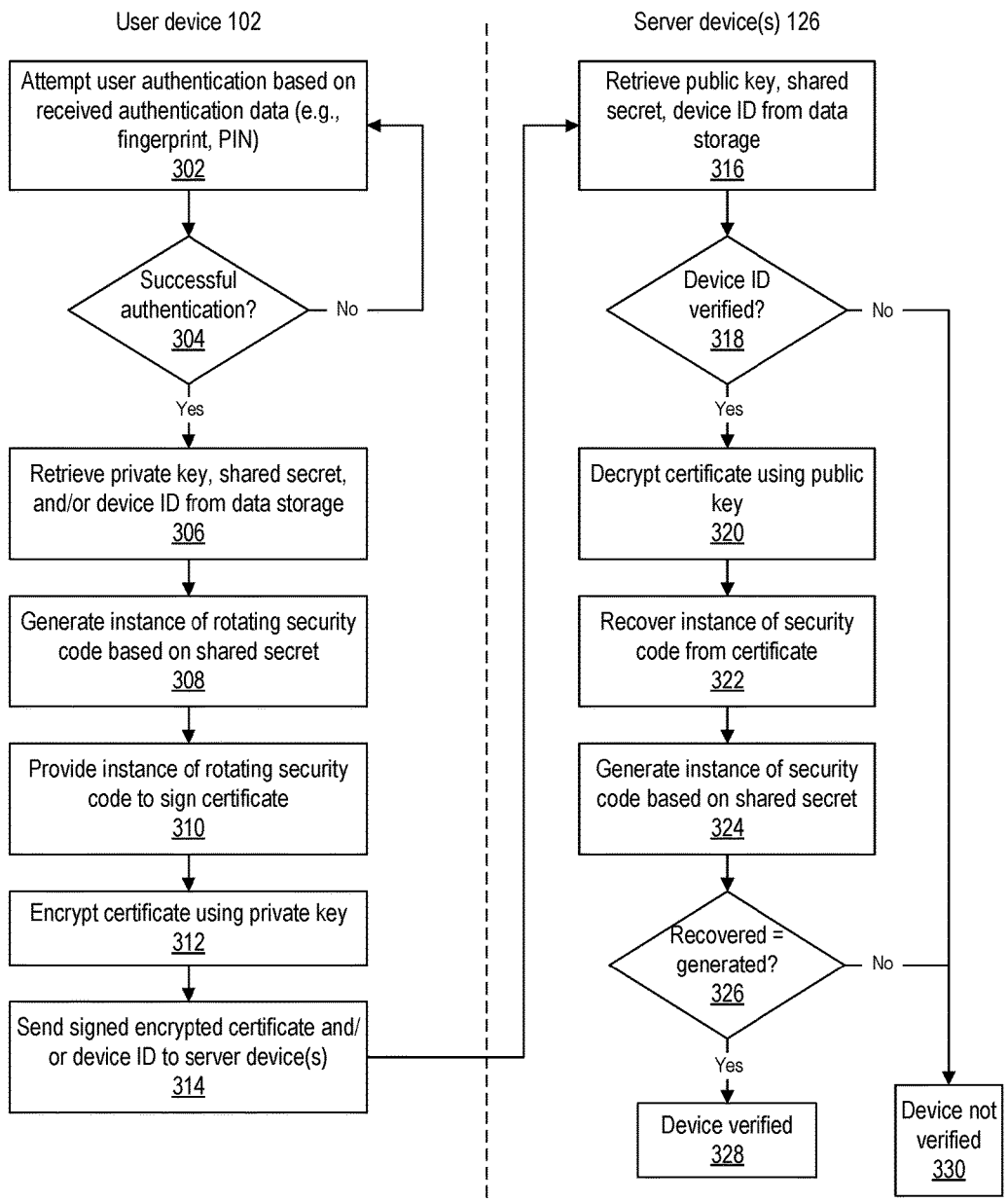
FIG. 3 depicts a flow diagram of an example process for multi-factor authentication and device verification, according to implementations of the present disclosure.

FIG. 3 depicts a flow diagram of an example process for multi-factor authentication and device verification, according to implementations of the present disclosure. Operations of the process may be performed by one or more of the user authentication module(s) 106, the device verification module(s) 110, the token generator 120, the device verification module(s) 128, the token generator 134, and/or other software module(s) executing on the user device 102, the server device(s) 126, or elsewhere.

User authentication may be attempted (302) on the user device 102 based on received authentication data 108, such as a user's scanned fingerprint, a PIN, and/or other information as described above. If the authentication is not successful (304), the user 104 may be prompted to re-enter the authentication data 108 and/or provide other types of authentication data 108. If the authentication is successful (304), the data storage 110 may be accessed to retrieve (306) the private key 118, the shared secret 114, and/or the device ID 116. In some implementations, the successful authentication of the user 104 may unlock or otherwise enable access to the data storage 110.

As described above, the shared secret 114 may be employed to generate (308) an instance of the rotating security code 122 as described above. The generated instance of the security code 122 may be employed (310) to sign the certificate 124.

The private key 118 may be employed to encrypt (312) the signed certificate. The signed, encrypted certificate 124 may be sent (314) to the server device(s) 126. In some implementations, the device ID 116 may also be sent from the user device 102 to the server device(s) 126 as part of the device's assertion of validity (e.g., challenge) to access secure information.

On receipt of the certificate 124 and/or device ID 116 from the user device 102, the data storage 130 may be accessed to retrieve (316) the public key 132, device ID 116, and/or shared secret 114. In implementations where the device ID 116 is used as part of the challenge, the device ID 116 may be verified (318) by comparing the received device ID 116 to the device ID 116 that is retrieved from the data storage 130. If the device IDs 116 do not correspond to one another, the user device 102 may not be verified (330).

If the device IDs 116 correspond to one another, the received certificate 124 may be decrypted (320) using the public key 132. The decrypted certificate 124 may be examined to recover (322) the instance of the security code 122 that was used to sign the certificate 124 on the user device 102. An instance of the security code 122 may be generated (324) based on the shared secret 114 retrieved from the data storage 130. As described above, the generated security code 122 may be compared (326) to the security code recovered from the decrypted certificate. If the security codes 122 correspond to one another, the user device 102 may be verified (328). If the security codes 122 do not correspond to one another, the user device 102 may not be verified (330). The verification result 136 may indicate whether the user device 102 is verified, as described above. The user device 102 may be permitted, or denied, access to secure information based on the verification result 136.

Figure 4:
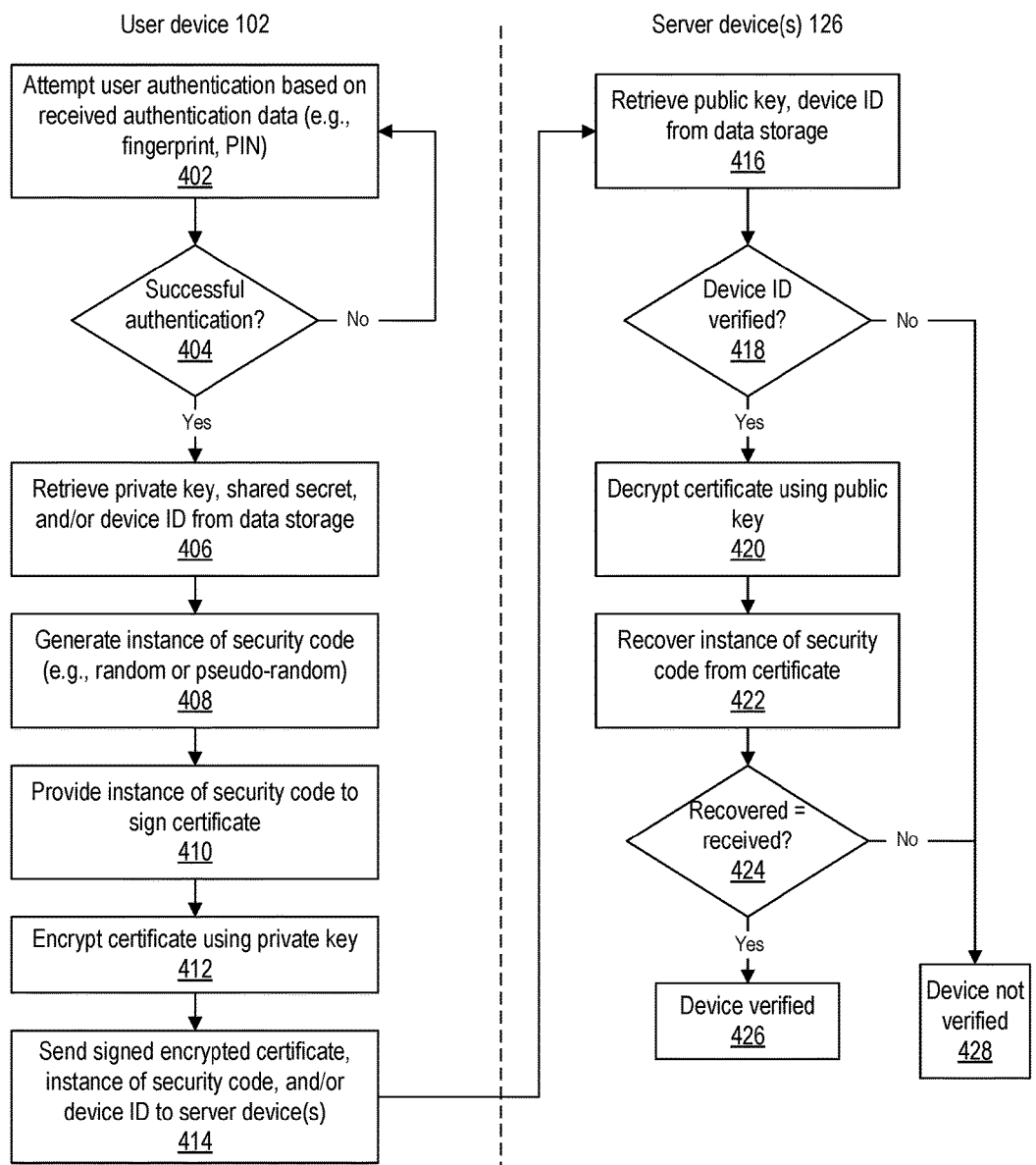
FIG. 4 depicts a flow diagram of an example process for multi-factor authentication and device verification, according to implementations of the present disclosure.

FIG. 4 depicts a flow diagram of an example process for multi-factor authentication and device verification, according to implementations of the present disclosure. Operations of the process may be performed by one or more of the user authentication module(s) 106, the device verification module(s) 110, the token generator 120, the device verification module(s) 128, the token generator 134, and/or other software module(s) executing on the user device 102, the server device(s) 126, or elsewhere.

FIG. 3 illustrates implementations in which the shared secret 114 is used to independently generate the security code 122 on the user device 102 and the server device(s) 126, as described with reference to FIG. 1. FIG. 4 illustrates implementations in which the security code 122 is generated on the user device 102 and communicated to the server device(s) 126 as part of the device's assertion, as described with reference to FIG. 2.

As shown in the example of FIG. 4, user authentication may be attempted (402) on the user device 102 based on received authentication data 108, such as a user's scanned fingerprint, a PIN, and/or other information as described above. If the authentication is not successful (404), the user 104 may be prompted to re-enter the authentication data 108 and/or provide other types of authentication data 108. If the authentication is successful (404), the data storage 110 may be accessed to retrieve (406) the private key 118, the shared secret 114, and/or the device ID 116. In some implementations, the successful authentication of the user 104 may unlock or otherwise enable access to the data storage 110.

An instance of the rotating security code 122 may be generated (408). As described above, in some implementations the instance of the security code 122 may be generated as a random (or pseudo-random) number. In some implementations, the instance of the security code 122 may be generated based on the shared secret 114. The generated instance of the security code 122 may be employed (410) to sign the certificate 124. The private key 118 may be employed to encrypt (412) the signed certificate. The signed, encrypted certificate 124 may be sent (414) to the server device(s) 126 with the security code 122. In some implementations, the device ID 116 may also be sent from the user device 102 to the server device(s) 126 as part of the device's assertion of validity (e.g., challenge) to access secure information.

On receipt of the certificate 124, security code 122, and/or device ID 116 from the user device 102, the data storage 130 may be accessed to retrieve (416) the public key 132 and/or device ID 116. In implementations where the device ID 116 is used as part of the challenge, the device ID 116 may be verified (348) by comparing the received device ID 116 to the device ID 116 that is retrieved from the data storage 130. If the device IDs 116 do not correspond to one another, the user device 102 may not be verified (428).

If the device IDs 116 correspond to one another, the received certificate 124 may be decrypted (420) using the public key 132. The decrypted certificate 124 may be examined to recover (422) the instance of the security code 122 that was used to sign the certificate 124 on the user device 102. The received security code 122 may be compared (424) to the security code recovered from the decrypted certificate. If the security codes 122 correspond to one another, the user device 102 may be verified (426). If the security codes 122 do not correspond to one another, the user device 102 may not be verified (428). The verification result 136 may indicate whether the user device 102 is verified, as described above. The user device 102 may be permitted, or denied, access to secure information based on the verification result 136.

The device verification process described above may be employed to determine whether the user device 102 is to be permitted access to secure information, and implementations may employ the process to control access of the user device 102 to various types of secure information in a variety of contexts. In some implementations, the secure information may be one or more portions of an application (e.g., an app) executing on the user device 102. For example, the user device 102 may execute a financial services application, and the verification result 136 may be used to determine whether the user 104 is to be permitted access to portions of the application that present confidential financial information such as account numbers, account balances, transaction history, and so forth. The verification result 136 may also be employed to determine whether the user 104 is to be permitted to request certain high-risk operations through the application, such as funds transfers, purchases, opening and closing accounts, address changes, and so forth. In some implementations, the verification result 136 may be used to determine whether the user device 102 and/or user 104 is to be permitted access to secure data that is stored on the user device 102 or elsewhere. The authentication and device verification techniques described herein may be employed to control access to various types of secure information, including but not limited to financial information, health care records, personally identifiable information (PII) for one or more individuals, and so forth.

Figure 5:
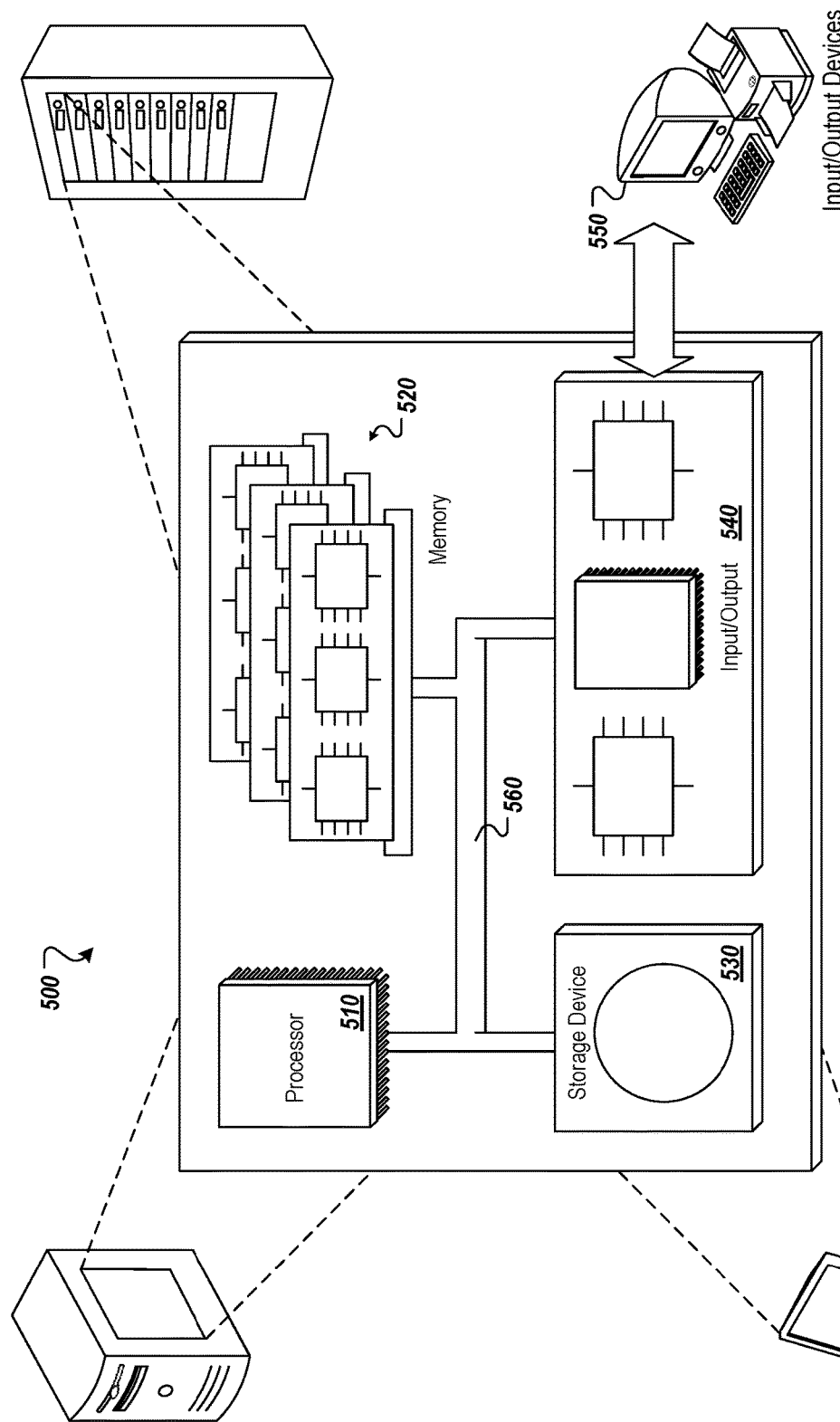
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 102, the server device(s) 126, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather be as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   retrieving, by the at least one processor, a first cryptographic key from data storage on a user device;
   generating, by the at least one processor, a first instance of a rotating security code, wherein the rotating security code changes with a periodicity;
   signing, by the at least one processor, a first certificate using the first instance of the rotating security code, wherein the first certificate is an assertion that the user device is authorized to access secure information;
   encrypting, by the at least one processor with the first cryptographic key, the first certificate signed using the first instance of the rotating security code; and
   communicating, by the at least one processor, the encrypted first certificate to a service that verifies, based on the first certificate, that the user device is authorized to access secure information;
   generating, by the at least one processor, a second instance of the rotating security code;
   signing, by the at least one processor, a second certificate using the second instance of the rotating security code;
   encrypting, by the at least one processor with the first cryptographic key, the second certificate signed with the second instance of the rotating security code; and
   communicating, by the at least one processor, the encrypted second certificate to the service that verifies, based on the second certificate, that the user device is authorized to access secure information.

2. The method of claim 1, wherein the first cryptographic key is retrieved from the data storage in response to a successful authentication of a user of the user device based on authentication data associated with the user.

3. The method of claim 2, wherein the authentication data includes one or more of biometric data and a personal identification number (PIN).

4. The method of claim 1, wherein:
   the first and second instance of the rotating security code are generated based on a shared secret that is stored in the data storage on the user device; and
   a copy of the shared secret is accessible by the service for use in verifying that the user device is authorized to access the secure information.

5. The method of claim 1, wherein:
   the first and second instance of the rotating security code are generated using an algorithm for random or pseudo-random number generation; and
   the first and second instance of the rotating security code are communicated to the service for use in verifying that the user device is authorized to access the secure information.

6. The method of claim 1, further comprising:
   retrieving, by the at least one processor, a device identifier (ID) from the data storage, the device ID uniquely identifying the user device among a plurality of user devices; and
   communicating, by the at least one processor, the device ID with the first and second certificate to the service for use in verifying that the user device is authorized to access the secure information.

7. The method of claim 6, wherein the device ID is a token that complies with a version of an OAuth standard.

8. The method of claim 1, wherein verifying that the user device is authorized to access the secure information includes, for each of the first certificate and second certificate:
   decrypting the certificate to recover the instance of the security code from the certificate, the decrypting using a second cryptographic key that is associated with the first cryptographic key;
   comparing the instance of the security code with an expected instance of the security code; and
   based on a correspondence between the instance of the security code and an expected instance of the security code, allowing the user device to access the secure information.

9. A system, comprising:
   at least one processor; and
   a memory communicatively coupled to the at least one processor, the memory storing instructions which, when executed by the at least one processor, cause the at least one processor to perform operations comprising:
   retrieving a first cryptographic key from data storage on a user device;
   generating a first instance of a rotating security code, wherein the rotating security code changes with a periodicity;
   signing a first certificate using the first instance of the rotating security code, wherein the first certificate is an assertion that the user device is authorized to access secure information;
   encrypting, with the first cryptographic key, the first certificate signed using the first instance of the rotating security code;
   communicating the encrypted first certificate to a service that verifies, based on the first certificate, that the user device is authorized to access secure information;
   generating a second instance of the rotating security code;
   signing a second certificate using the second instance of the rotating security code;
   encrypting, with the first cryptographic key, the second certificate signed with the second instance of the rotating security code; and
   communicating the encrypted second certificate to the service that verifies, based on the second certificate, that the user device is authorized to access secure information.

10. The system of claim 9, wherein the first cryptographic key is retrieved from the data storage in response to a successful authentication of a user of the user device based on authentication data associated with the user.

11. The system of claim 10, wherein the authentication data includes one or more of biometric data and a personal identification number (PIN).

12. The system of claim 9, wherein:
   the first and second instance of the rotating security code are generated based on a shared secret that is stored in the data storage on the user device; and a copy of the shared secret is accessible by the service for use in verifying that the user device is authorized to access the secure information.

13. The system of claim 9, wherein:
the first and second instance of the rotating security code are generated using an algorithm for random or pseudo-random number generation; and
the first and second instance of the rotating security code are communicated to the service for use in verifying that the user device is authorized to access the secure information.

14. The system of claim 9, the operations further comprising:
retrieving a device identifier (ID) from the data storage, the device ID uniquely identifying the user device among a plurality of user devices; and
communicating the device ID with the first and second certificate to the service for use in verifying that the user device is authorized to access the secure information.

15. The system of claim 14, wherein the device ID is a token that complies with a version of an OAuth standard.

16. The system of claim 9, wherein verifying that the user device is authorized to access the secure information includes, for each of the first certificate and second certificate:
decrypting the certificate to recover the instance of the security code from the certificate, the decrypting using a second cryptographic key that is associated with the first cryptographic key;
comparing the instance of the security code with an expected instance of the security code; and
based on a correspondence between the instance of the security code and an expected instance of the security code, allowing the user device to access the secure information.

17. One or more non-transitory computer-readable media storing instructions which, when executed by at least one processor, cause the at least one processor to perform operations comprising:
retrieving a first cryptographic key from data storage on a user device;
generating first instance of a rotating security code, wherein the rotating security code changes with a periodicity;
signing a first certificate using the first instance of the rotating security code, wherein the first certificate is an assertion that the user device is authorized to access secure information;
encrypting, with the first cryptographic key, the first certificate signed using the first instance of the rotating security code;
communicating the encrypted first certificate to a service that verifies, based on the first certificate, that the user device is authorized to access secure information;
generating a second instance of the rotating security code;
signing a second certificate using the second instance of the rotating security code;
encrypting, with the first cryptographic key, the second certificate signed with the second instance of the rotating security code; and
communicating the encrypted second certificate to the service that verifies, based on the second certificate, that the user device is authorized to access secure information.

18. The one or more non-transitory computer-readable media of claim 17, wherein the first cryptographic key is retrieved from the data storage in response to a successful authentication of a user of the user device based on authentication data associated with the user.

19. The one or more non-transitory computer-readable media of claim 18, wherein the authentication data includes one or more of biometric data and a personal identification number (PIN).

20. The one or more non-transitory computer-readable media of claim 17, wherein:
the first and second instance of the rotating security code are generated based on a shared secret that is stored in the data storage on the user device; and
a copy of the shared secret is accessible by the service for use in verifying that the user device is authorized to access the secure information.

* * * * *

UNITED STATES PATENT AND TRADEMARK OFFICE
CERTIFICATE OF CORRECTION

| | |
|---|---|
| PATENT NO. | : 10,461,942 B1 |
| APPLICATION NO. | : 15/652810 |
| DATED | : October 29, 2019 |
| INVENTOR(S) | : Hoang Trung Vo and Sudarshan Rangarajan |

It is certified that error appears in the above-identified patent and that said Letters Patent is hereby corrected as shown below:

On the Title Page

Column 1, item (72), (Inventors), Line 1, delete "San Antontio," and insert -- San Antonio, -- therefor.

Column 1, Item (73), (Assignee), Line 2, delete "Association," and insert -- Association (USAA), -- therefor.

In the Claims

Column 15, Line 25, Claim 1, after "code;" delete "and".

Signed and Sealed this
Twelfth Day of May, 2020

Andrei Iancu
*Director of the United States Patent and Trademark Office*